United States Patent [19]

Levine

[11] Patent Number: 5,093,813

[45] Date of Patent: Mar. 3, 1992

[54] MULTIPLE MODE ELECTRONIC SCHEDULER

[76] Inventor: Alfred B. Levine, P.O. Box 15968, Chevy Chase, Md. 20825

[21] Appl. No.: 230,229

[22] Filed: Aug. 9, 1988

Related U.S. Application Data

[63] Continuation-in-part of Ser. No. 831,878, Feb. 24, 1986, Pat. No. 4,783,800, which is a continuation-in-part of Ser. No. 566,312, Dec. 28, 1983, abandoned, and a continuation-in-part of Ser. No. 580,150, Feb. 14, 1984, abandoned, which is a continuation-in-part of Ser. No. 568,359, Jan. 5, 1984, Pat. No. 4,548,510, Ser. No. 230,229, , Continuation-in-part of Ser. No. 22,238, Mar. 5, 1987, Pat. No. 4,769,769, which is a continuation-in-part of Ser. No. 580,150, Feb. 14, 1984, abandoned.

[51] Int. Cl.⁵ .................... G04B 47/00; G04B 45/00
[52] U.S. Cl. .................................. 368/10; 368/29; 368/41
[58] Field of Search .................. 368/10, 28–30, 368/41–43; 364/569, 705, 709, 710

[56] References Cited

U.S. PATENT DOCUMENTS

| | | | |
|---|---|---|---|
| 4,162,610 | 7/1979 | Levine | 368/10 |
| 4,379,640 | 4/1983 | Inoue et al. | 368/63 |
| 4,503,288 | 3/1985 | Kessler | 379/96 |
| 4,517,410 | 5/1985 | Williams et al. | 379/73 |
| 4,548,510 | 10/1985 | Levine | 368/10 |
| 4,626,836 | 12/1986 | Curtis et al. | 340/706 |
| 4,769,796 | 9/1988 | Levine | 368/29 |
| 4,783,800 | 11/1988 | Levine | 379/67 |
| 4,831,552 | 5/1989 | Scully et al. | 364/518 |
| 4,866,611 | 9/1989 | Cree et al. | 364/300 |

Primary Examiner—Vit W. Miska

[57] ABSTRACT

An electronic scheduler for making appointments that provides for a greater degree of automatic operation in locating an available time-of-day time slot for appointment. Multiple modes of operation are selectively provided to a user to quickly find an available time slot that conforms to the user's preferences and prior time committments. For use in office environments, the scheduler may be adapted for use with a series of different persons, with the user selecting one of those persons for an appointment. The scheduler may be used locally or may be connected to a telephone line for remotely controlled operation by a caller. In any of such different embodiments, the scheduler may be provided with interactive features, including the communication of instructions to the user for the selection of one of the plural modes of operation that is most useful for the user's needs and preferences. The scheduler further notifies the user in the event that a free time slot for appointment is not available on the day, time-of-day, or other time parameter selected by the user, and instructs the user to select a different mode-of-operation or time parameter.

22 Claims, 3 Drawing Sheets

MULTIPLE MODE ELECTRONIC SCHEDULER

RELATED APPLICATIONS

This application is a continuation-in-part of application Ser. No. 831,878 filed Feb. 24, 1986, now U.S. Pat. No. 4,783,800, which is, in turn, a continuation-in-part of application Ser. No. 566,312 filed Dec. 28, 1983, (now abandoned, and of Ser. No. 580,150 filed Feb. 14, 1984 (now abandoned). Application Ser. No. 580,150 now abandoned) is, in turn, a continuation-in-part of application Ser. No. 568,359, filed Jan. 5, 1984, now U.S. Pat. No. 4,548,510.

The present application is also a continuation-in-part of application Ser. No. 22,238, filed Mar. 5, 1987, now U.S. Pat. No. 4,769,796, which, in turn, is a continuation-in-part of application Ser. No. 580,150 (now abandoned).

BACKGROUND AND PRIOR APPLICATIONS

In earlier application Ser. No. 831,878, now U.S. Pat. No. 4,783,800, there is provided a remote controlled, interactive telephone appointment scheduler that enables a caller to make an appointment over the telephone without the need for a person at the receiving end of the telephone line. In other of said earlier applications, and in earlier U.S. Pat. No. 4,162,610, now Reissue Pat. No. 32,655 there are provided other electronic schedulers enabling users to make appointments, keep readily accessable schedules of appointments, and otherwise more efficiently manage the use of available time.

SUMMARY OF THE INVENTION

According to the present invention, there is provided an electronic scheduler and system of this kind that provides a greater degree of versatility, including more automatic searching of the electronic memory, thereby enabling a user to more easily, promptly, and automatically find a satisfactory time for appointment with another.

More specifically, there is provided a multiple mode of operation electronic scheduler for making appointments in which a user need only specify a desired mode of operation and a desired time parameter, including one of a desired time-of-day; a desired day or day of the week; or other desired time parameter for an appointment, and the scheduler automatically locates an available time slot for appointment within the selected time parameter. Where the scheduler is used for making appointments with any one of a series of different persons, the user also selects the particular person with whom the appointment is desired. For example, where the user selects a time-of-day mode and selects a desired time-of-day for appointment with a particular person, the scheduler automatically searches its memory to locate an available time slot that is free for appointment with the selected person at the selected time-of-day, and notifies the user of the day for such appointment. Where an available time slot cannot be found according to the user's preference, the scheduler so informs the user and suggests that the user select a different mode and/or a different time parameter.

According to further features of the invention, the scheduler of the present invention may be used locally with access by use of a local keyboard; or like parent application Ser. No. 831,878, now U.S. Pat. No. 4,783,800, referred to above, may be interconnected with a telephone line, to permit callers to make appointments over the telephone without the need for a person at the receiving end of the line.

DETAILED DESCRIPTION OF PREFERRED EMBODIMENTS

As earlier disclosed in U.S. Pat. No. 4,162,610, now reissue 32,655; and in U.S. Pat. No. 4,548,510, the electronic scheduler of the present invention is preferably made in small size, employing completely solid state dedicated components, for use as a hand carryable unit or as a small desk top unit. It employs an internal memory of sufficiently large capacity to randomly receive and store a large number of appointments and events by day or time period, covering a large number of days in the future. A keyboard is provided for enabling a user to enter and selectively read-out schedules of appointments by day and time-of-day; and the appointments are selectively displayed on a screen and/or audibly announced and/or printed out on a sheet of paper or the like. The present invention provides for various automatic operation of such a scheduler in a number of different modes-of operation as selected by a user.

Figure 1:
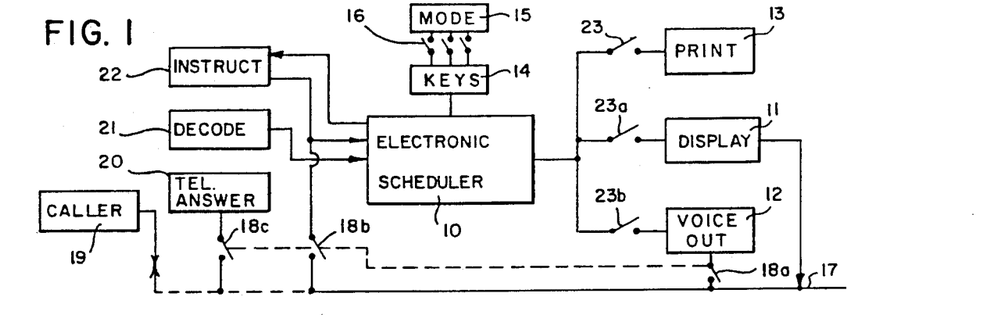
FIG. 1 is a block diagram illustrating a multi-mode scheduler of the present invention selectively connectable to a telephone line.

FIG. 1 illustrates a multiple mode-of-operation scheduler 10, according to the present invention, that may be used locally by a user under control of a keyboard 14 or alternatively, may be selectively connectable to a telephone line 17, via switches 18a, 18b, and 18c, for enabling a remotely located caller 19 to make an appointment over the telephone line 17, without the need for a person at the receiving end of the line 17.

As shown in FIG. 1, for remote controlled operation, the electronic scheduler 10 is interconnected with a telephone answering machine 20, a digital decoder circuit 21, an audible instruction generator 22, and an audible schedule announcer 12. As previously disclosed in greater detail in U.S. Pat. No. 4,769,796, telephone calls from the remote caller 19 are intercepted by the telephone answering machine 20, and a message is announced to the caller 19 by the message generator 22, to instruct the caller 19 in the procedure to be followed in making the appointment. Such instructions are preferably brief and easy to understand including a request that the caller initially select a time period when an appointment is desired, that may include a particular day, or day of the week, a specific time-of-day; a morning or afternoon appointment; or an appointment at any time within a given week, or other preferred mode-of-operation. Such initial mode selection is easily made by the caller 19 depressing a different number key for each mode, on the keypad of the telephone, or dialing such number on the dial of the telephone. Where the user is located at the situs of the scheduler 10, this initial mode-of-operation selection is made using a keyboard 14 and switches 16, as instructed by a message appearing on the visual screen of the display 11 and/or being audibly announced by annunciator 22.

After making the initial selection of a desired mode-of-operation, the user or caller 19 is then instructed by annunciator 22 and/or display, to select a desired time parameter for that mode by depressing a different number on the telephone keypad or closing the same number on the local keyboard 14, 15, 16. For example, where a user desires an appointment only at a particular time-of-day, e.g. 3:00 PM, the user or caller 19 initially depresses a key corresponding to the desired time-of-day mode of operation, and then depresses a number key for "3" followed by depressing the "*" key for PM. In a similar manner, if the user desires an appointment only on a particular day, the user selects a day mode-of-operation (by initially depressing a number key designated for that mode), followed by later depressing another number key or keys corresponding to the time parameter for that mode, such as the date for the selected day.

Upon making these simplified selections using the telephone keypad, or locally using the keyboards and switches 14, 15, 16, the electronic scheduler 10 is placed in the automatic mode of operation selected by the user, to automatically interrogate its memory and seek an available appointment time-of-day in accordance with the user's preferences. In the event such a free time slot is located, the display 11 and audible schedule announcer 12 is energized to inform the local user or remote caller 19, that the preferred appointment time is available and to additionally enter such an appointment into the memory of the scheduler 10. The remote caller 19, or local user, is also instructed by announcer 22, to confirm the appointment by audibly dictating the caller's identification (e.g. name, address, phone number etc.) into the phone for recording by the telephone answerer 20 together with a verbal restatement of the date and time for the scheduler appointment. Where the user is locally situated, the same information can be dictated into a local voice recorder (not shown), as instructed by local visual display 11 and/or announced by the audible instructor 22.

On the other hand, if the preferred appointment time-of-day or data selected by the caller 19 or user is not available, the user is informed ( audibly and/or by display, as previously described) to select a different mode-of-operation, or a different time parameter, or both, in seeking an appointment.

According to the present invention, there is provided a number of different modes of operation that can be individually selected by the user or caller, to most conveniently suit the caller's needs. For example, as briefly discussed above, the user can select a time-of-day mode and specify a desired time for appointment. The scheduler 10 is then automatically interrogated for each succeeding day until finding a free time slot at the selected time-of-day. Alternatively, the user can select a day mode of operation, followed by the selection of a particular day, such as the next day. The scheduler 10 is then automatically interrogated for each time slot on the following day, until finding the first available free time slot for that day. In a similar manner, the user may prefer only an afternoon appointment (e.g. an appointment from 12:30 PM until 5 PM). In this mode, the scheduler 10 is automatically interrogated for the afternoon periods only of the next succeeding series of days until finding the first available time slot in the afternoon for the earliest day. Still other modes that can be selected are a particular day of the week (e.g. a Wednesday); or only a morning appointment (e.g. from 9 AM to 12 PM); or a series of different times-of-day that would be convenient; or others. For each such different mode selection, the memory of the scheduler is automatically interrogated for a reasonable period of days (such as the next four days or week) to seek a free time slot according to the mode and time parameter that has been entered by the user or caller 19. In the event that such a time slot is found, the user is notified and requested to confirm the appointment day and time-of-day. In the event that such a desired appointment is not available, the user or caller is notified and requested to select a different mode and/or time parameter, as discussed above. Alternatively it may be desired that the caller 19 or user be informed to visit or telephone a different number and make an appointment with a receptionist, secretary, or other person in a conventional person-to person manner, in the event that the automatic interrogation of the scheduler 10 does not locate a free time slot on the first try by the user.

Still further according to the present invention, the electronic scheduler 10 may be placed into use for a number of different persons such as those commonly involved in a related business or professional practice, such as a clinic including a series of physicians. For such group type use, the appointments for each of such persons in the related practice or business are entered into the memory of the scheduler 10, with each such appointment being identified in the memory as associated with the particular person of the group. The caller 19 or local user is then additionally instructed to select the particular person with whom an appointment is desired, as well as specifying the mode and the time parameter within that mode as discussed above. After making such selections, by entering the numbered keys on the telephone keypad or on the local keyboard 14, 15, 16, the scheduler is automatically interrogated for the appointment schedules of only the person selected, to seek an available time slot for the mode and time parameter preferred by the user or caller. All other functions subsequently performed by the scheduling system are the same as those described above.

Figure 2:
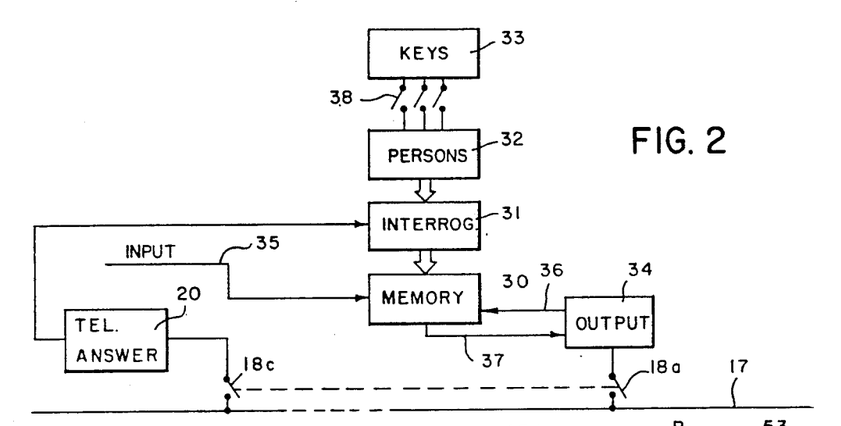
FIG. 2 is a block diagram similar to FIG. 1, showing the appointment scheduler usable for making appointments with any one of a number of persons.

FIG. 2 illustrates portions of such an automatic scheduling system for use by groups of persons as described above. As shown, the user (or caller) initially enters a selection of the mode-of-operation desired, and of the preferred time parameter, through use of the keyboard 33, in the same manner as previously discussed. The user then makes a selection of the particular person with whom such an appointment is desired by depressing the appropriate one of the switches 38. All of these selections are interpreted by the circuit 32, and the internal memory 30 is automatically interrogated accordingly by the interrogator circuitry 31 to locate a free time slot in the manner previously described. If a free time slot is found, the user is notified and confirms the appointment. If not, the user or caller is instructed to make other selections, or to call or visit to make an appointment in a person-to person manner. As shown, the scheduler of FIG. 2 is selectively connectable to the telephone line 17, in the same manner as previously described in FIG. 1, to permit such group scheduling to be performed over the telephone line 17. In both embodiments of FIGS. 1 and 2, individual appointments can also be entered locally, and at random, by inputs 33 (FIG. 2), as disclosed in greater detail in earlier U.S. Pat. No. 4,162,610; reissue U.S. Pat. No. 32,655, and others discussed above.

Figure 3:
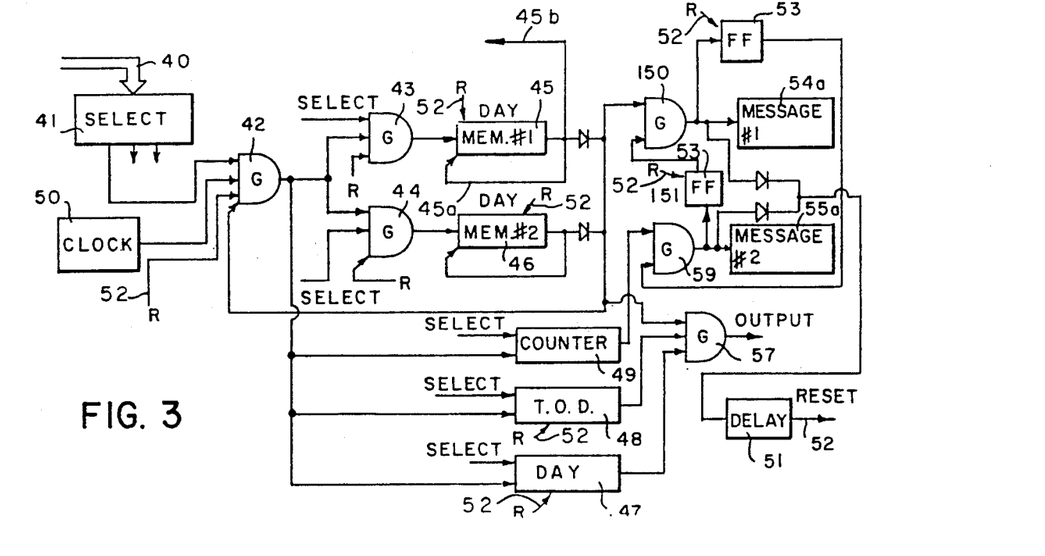
FIG. 3 is a similar block diagram showing the circuit interconnections where the user selects a preferred day mode of operation.

FIG. 3 shows in greater detail the preferred circuit interconnections of the electronic scheduler system where the user, or caller, selects a day mode of operation, thereby indicating a preference for an appointment at the first available time during a selected day. Such selection, including a time parameter (particular day); and possibly including a desired person (for group scheduling uses), are entered over input cable 40 from a keyboard or telephone, as shown in FIGS. 1 and 2, to the selection circuits 41 to effect the gate interconnections as shown in the drawing.

The selection of the day mode and of a specific day, closes the and gate circuits 43 for the day memory 45 that is associated with the selected day. The select circuit 41 also closes the AND gate 42; energizes the day generator 47 and time-of-day generator 48; and pulse counter 49. Closing of the and gate 42 applies the succession of clock pulses from clock generator 50 through gates 42 and 43 to interrogate each of the time slots slots in the day memory 45 in chronological order, in an automatic manner. Memory 45 is preferably a matrix type well known and available on the open market, with each different time slot for the selected day being allocated at a different location, or address, in the matrix. The succession of clock pulses are directed by a shift register circuit, or the like (not shown), to interrogate each address, until locating a free time slot in the matrix. Upon locating such a free time slot, an output signal is generated from day memory 45, and passes through gate 57, to the output circuit 56, that may comprise a display, printer, and/or audible announcer as shown in FIG. 1. The closing of gate 57 also passes the output signals from the day generator 47 and the time of day generator 48 to the output circuit, to be displayed, printed, and/or audibly announced. The day generator 47 and time-of-day generator 48 are both conventional solid state circuits commonly used in electronic digital watches to display the day and time. However, instead of continuously showing the changing time and date, these signal are gated by the gate 57, to pass only the date and time for the free time slot that has been located by automatic interrogation of the day memory 45.

The output signal from day memory 45, is also fed back over line 45a to enter a new appointment into memory 45 at that time slot, and also fed back over line 45b to close the clock gate 42 and discontinue interrogation of the memory 45. The output from memory 45 is also directed to delay circuit 51, through gate 150 to energize the reset line 52, for resetting the entire circuit after the free time slot has been located, entered into memory, and the user has been notified. The memory output from memory 45 also closes gate 54 to energize the message #1 circuit 54a, thereby to notify the user or caller, of the appointment, and to request that the user confirm the appointment as discussed above.

In the event that the automatic interrogation of the selected day memory 45 does not locate a free time slot that is available for appointment, an output is not produced during interrogation of this memory 45. Instead, a counter 49, being pulsed concurrently with the memory 45, generates a pulse after such interrogation is completed, to message #2 generator 55a to inform the user and to request that a different mode or time parameter be selected, as discussed above. In the event of an output from the day memory 45, representing a free time slot, the alternate message generator 55a is disabled by the flip flop circuit 53 responding to the memory 45, whereby the user is only informed of the appointment being made and not given any no appointment message.

Briefly recapitulating the functioning of the circuit for the user's selection of a day mode, and the selection of a particular day, the section of the memory 45 containing the storage of appointments for that day (e.g. memory 45) is automatically interrogated by the clock pulses from 50, with the different time slots being chronologically interrogated. Assuming that appointments are to be scheduled every fifteen minute interval, during the day from 9 AM to 5 PM, each cf the day memories, or sections of the memories need have only 28 time slots, or addresses that are allocated for storage of appointments for that day. In the event that a free or uncommitted time slot is located during such chronological interrogation, an output signal is produced that discontinues further interrogation of the memory, informs the user or caller of the availability, enters the appointment and resets the circuit, as discussed above. However, in the event that all 28 time slots for that day have been previously filled, or engaged, a pulse counter 49, that is pulsed concurrently with interrogation of the memory, by the clock 50, responds to the 29th. pulse to generate an output signal to a message generator 55a, informing the user that an appointment is not available on that day, and to select a different day and/or a different mode of operation, and/or to call or visit to make an appointment in a person-to-person manner with a receptionist, secretary, or other person at that office. In the event that a free time slot has been previously located, before the 29th pulse from clock 50 is generated, then the output signal produced by the interrogated day memory 45 is directed to a flip flop circuit 53, to trigger the flip flop 53 and disable the gate circuit 59 from closing when it receives the output pulse from counter 49. The delay circuit 51 is selectively pulsed to reset the entire circuit, by either the output signal from the memory 45, or by the pulse outputted by gate 59 in the event that a free time slot is not located. Thus in the event that a free time slot is located in the selected day, the user is so informed by message generator 54a, as discussed above. However, in the event that a free time slot is not located during the selected day, a different message from generator 55a so informs the user, and issue a appropriate instructions.

When the day mode of operation has been selected, the day generator 47 repetitively generates the same digital signals, representing the day selected, in response to each pulse received from the clock 50. The time-of-day generator 48, on the other hand, responds to each received clock pulse to generate a different digital signal representing a different time of day, corresponding to that address of the memory 45 being concurrently interrogated. For example, presupposing the scheduler has been set up for a scheduling of appointments every 15 minutes for a day from 9 AM to 5 PM (28 time slots), the time-of-day generator 48 successively generates 28 different digital signals corresponding to the 28 time slots, in response to the succession of 28 pulses received from the clock 50. If a free time slot is located during that day, the appointment is made as discussed above, and the circuit, including the time-ofday generator 48, is reset, to commence generating a 9 AM signal when the scheduler is next placed into operation by a subsequent user. If a free time slot is not found, the circuit, including the time-of-day generator 48 is reset, but after the counter 49 has counted 28 pulses from the clock 50.

TIME OF DAY MODE OF OPERATION

Figure 4:
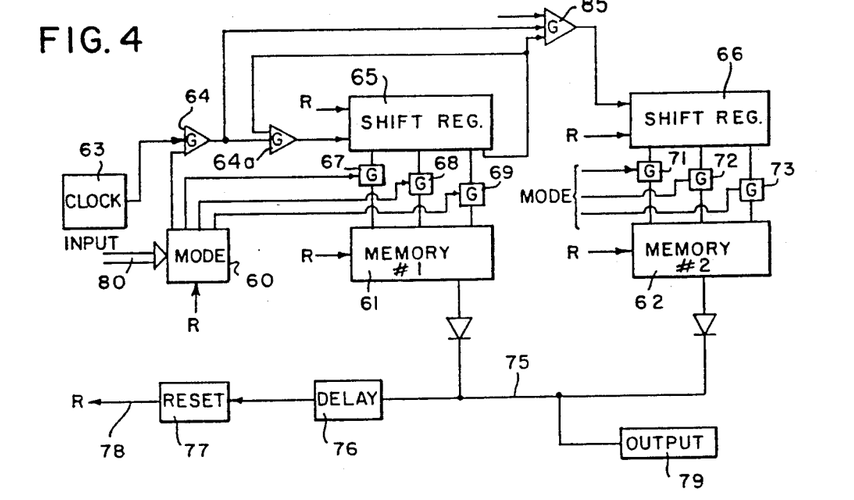
FIG. 4 is a similar block diagram showing the circuitry where the user selects a preferred time-of-day mode of operation.

FIG. 4 shows the preferred circuit interconnections where the user selects a time of day mode of operation, and then selects as the time parameter a specific time-of-day (e.g. 10:15 AM) for an appointment. In this mode of operation, the memories for each succeeding day are successively interrogated in chronological order, until locating a free time slot at the selected time (e.g. 10:15 AM). In the same manner as previously described, the user is notified of the availability of an appointment at this time, and of the day, and such an appointment is enter into the memory section for that day. The user is also instructed to confirm that appointment, as discussed above. After the memory has been interrogated for a time period of about a week, or other time period that has been preestablished in the scheduler, and a free time slot has not been located, the user is so notified and instructed to make other selections, as previously discussed.

Referring to FIG. 4, the users selection of this mode and of a specific time-of-day is initially entered into the keyboard, or over the telephone, as previously described, and interpreted by the mode and logic circuit 60, to configure the circuit as shown. The mode circuit 60 closes a selected one of the gate 67 to 69 etc., for controlling the interrogation of the memory 61 for the next day, by the shift register circuit 65. For the above referred to set up of 28 time slots covering a business day, a total of twenty eight of such gates 67, . . . is provided, each one assigned to a different address of memory 61 during that day. The mode and logic circuit 60 also closes the corresponding gates, such as 71,72, etc. for the next day memory 62, as well as for those (not shown) for each of the succeeding days of that week, or other period, that has been pre-established in the scheduler.

The mode circuit 60 also closes the and gate 64, enabling the clock pulses 63 to pulse the shift register 65. Each different output of shift register 65 is connected through its gate 67 etc. to interrogate a different address or time slot of the day memory 61. However, since only a selected one or ones of these gates has been closed by the mode and logic circuit 60, only the selected one or ones of such addresses of the memory 61 are interrogated for that day. In the event that a free time slot is found to be available at the time-of-day or times-of-day selected by the user, an output pulse is generated by the memory 61 to line 75. In the same manner as described above in FIG. 3, this output pulse triggers the notification to the user, by a message generator (e.g. 54a in FIG. 3), confirming the appointment, and an appointment is entered into the memory 61 for that time slot. The user is also requested to confirm the appointment as discussed above.

However, if a free time slot is not found at the selected time during that day, the 29th. output line from shift register 65 pulses gate 85 to close this gate, and concurrently feeds back a pulse to open gate 64a. The opening of gate 64a discontinues pulsing of the shift register 65; and the closing of gate 85 commences the pulsing of shift register 66 to control the interrogation of the memory 62, or memory section for the second day. As earlier described, the same selected one, or ones, of the gates 71 to 74 etc. for the second shift register 66 have been closed whereby the memory 62 for the second day is interrogated for only the same time slot, or slots, that have been previously selected by the user. Thus the memory for the second day 62 is interrogated for the time slot selected by the user to determine whether that time-of-day is available for appointment on the second day. If it is the appointment is entered into the memory, and the user is notified and requested to confirm the appointment. However, if it is not available on the second day, the memory for the third day (not shown) is interrogated in the same automatic manner after the interrogation of the second memory has been completed without positive result. In the same manner, the memories for each succeeding day (not shown) are successively interrogated for a period up to one week or more, or for other period that has been preset into the scheduler. When the first available appointment time is found that coincides with the selection made by the user, the appointment is entered, confirmed, and the scheduler is reset, as above described. If no free time slot, or slots, as selected by the user, are found after interrogating a preset number of days in the future, the user is informed by a different message generator, such as generator 55a in FIG. 3, and instructed to selected a different time-of-day and/or different mode and/or make arrangements on a person-to person basis for an appointment.

It will be appreciated that the time-of-day generator (such as 48 in FIG. 3), will generate digital signals corresponding to the time slot of the memory being interrogated, since it is being concurrently pulsed by the same clock generator 50 (as in FIG. 3). However, the day generator (corresponding to 47 in FIG. 3), will successively generate the same digital signals, representing the day being interrogated, for each received one of 28 clock pulses. However, on the 29th clock pulse, the day generator (e.g. 47 in FIG. 3) is advanced to generate signals for the next day, and such next day signals are in like manner repeated for each clock pulse while the memory for the next day is being interrogated.

FIG. 4 also illustrates the circuit arrangement where the user selects a plurality of different times-of-day that would be convenient or acceptable for an appointment. The only difference over that of FIG. 4, is that plural ones of the gates for each shift register are closed, in response to the plural selections made by the user. Each of the day memories, or memory sections, are then interrogated for each of the plural time slots selected to seek an earliest free time slot that is available for appointment.

A still further variation using the same circuit configuration shown in FIG. 4 , permits a user to select different times-of-day for appointment on different days. For example, a user may find it convenient to have an appointment at 9:00 AM on Monday but if that is not available, to have the appointment at 2:15 PM on Tuesday. In this variation, the mode and logic circuit 60 closes the gate for the time slot at 9:00 AM for memory 61; and selectively closes the gate corresponding to time slot at 2:15 PM for memory 62. Each of these memories is then successively interrogated for only the time slots selected, in the same manner as previously described. If the first selection is found to be available, the appointment is made for this time and the automatic operation is discontinued and the circuit is reset. On the other hand, if the first appointment is not found to be available, the automatic interrogation of the second day memory is then commenced to look for a free time at the selected time-of-day on the second day.

Still a further variation can be performed using the circuit mode configuration shown in FIG. 4. Where the user wishes to have an appointment only in the morning hours (e.g. from 9:00 AM to 12:00 PM, inclusive), this is performed by closing all of the gates for each day memory that interconnect with the morning day slots of that memory. Thus as each of the day memories is interrogated in succession, only the morning day slots are observed to find an availability whereas the afternoon time slots are blocked by the gates from being interrogated. When the first free time slot is located, the appointment is automatically made, confirmed, and the circuit is reset. If a morning appointment is not made during the first day, the second day memory is thereafter interrogated in the same manner, observing only the morning time slots, to find the first available or free time slot. In this manner, each day is automatically looked at for the selected time period until finding a free time. Alternatively, if an appointment time is not found after automatically reviewing a preset number of days in succession, the user is notified, and instructed to change the mode, time parameter, or to seek a manual appointment in the conventional way.

Afternoon appointments can be made in the same way in the circuit of FIG. 4 by the user selecting the afternoon time slot periods, from 12:00 PM to 5 PM, whereby all of the afternoon time slot gates are closed for each day memory to permit interrogation of only the afternoon time slots. Where a user desires an afternoon appointment on one day, but a morning appointment on the next day in the event that the first day is not available, this selection can be made in the same way in FIG. 4. Here the specific time slots desired for each succeeding day are selectively entered into the keyboard, or telephone keypad or dial, and the corresponding gates to each different day memory are closed. Again, as previously described, each day memory is chronologically interrogated in sequence, for the time slots previously selected. Upon finding the first available time slot in accordance with the selections, an appointment is made and the automatic operations are discontinued.

WEEK MODE OF OPERATION

Figure 5:
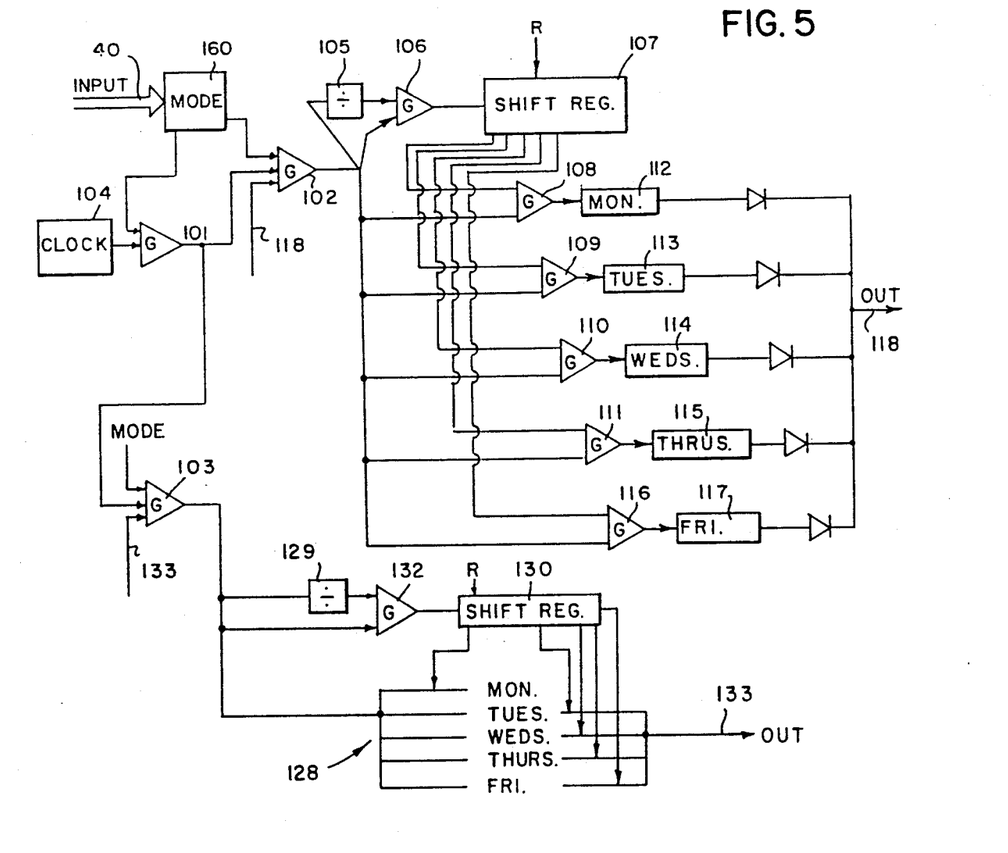
FIG. 5 is a similar block diagram showing the circuitry where the user selects a week mode-of-operation.

FIG. 5 illustrates a preferred circuit configuration for still another different mode of operation where a user selects a desired week, requesting an appointment at any time slot during that week. In this mode of operation, the scheduler automatically interrogates each memory for a different day of that week in succession, until locating a free time slot. The user is notified of the day and time slot during that day that is available, the appointment is automatically made, and confirmed, all as discussed earlier. If not available, the user is so notified and requested to make other selections.

Referring to FIG. 5, the week selection is made by the user and entered via the keyboard or telephone to the mode and logic circuit 160, as before. This circuit 160 interprets the entry commands and closes the gates 101 and 102 but leaves the gate 103 open. The gates 102 select the five day memories 112, 113, 114, 115, and 117 for the selected business week for automatic interrogation, and the gate 101 controls the application of the succession of pulses from the clock circuit 104 to interrogate the day memories. Each of the day memories 112, 113, 114, 115, and 117 is also controlled by its associated gate 108, 109, 110, 111, and 116, respectively, which, in turn, are successively turned on and off by the shift register 107. After the selections are made and the circuit is activated, the gates 101, 102, and 102 are closed, and the succession of clock pulses from clock 104 pass through these gates to chronologically interrogate the time slots in the day memory 112 that has been allocated for the first day, monday, of the selected business week. In the event that a free time slot is located on that monday, the appointment is made, confirmed, and the circuit is reset. However, in the event that no free time slot is located on monday after interrogating all of the time slots for that day, the shift register 107 is advanced by the pulse divider circuit 105 to its next output line, thereby closing the gate 109 and opening gate 108. The gate 109 controls the automatic interrogation of the second day memory, tuesday, to chronologically examine each time slot during that second day. This same process is automatically repeated for each succeeding day of that week until the first available time slot is located and an appointment is made and completed, as above described.

Assuming that the scheduler is arranged for entering appointments every fifteen minutes during a working day from 9 AM to 5 PM, a total of 28 time slots are allocated for each day memory or memory section (neglecting the periods for lunch and relaxation breaks during the day). Therefore the pulse divider 105 is preset to count a total of 28 pulses from clock 104, and to energize the shift register 107 to advance to its next output line on the 29th pulse of each sequence. In this manner the gate controlling interrogation for each day memory is selectively closed in sequence, and remains closed until all time slots of that memory have been interrogated. When the first available time slot is located an output pulse is generated over output line 118 to complete the automatic scheduling as described above in connection with FIG. 3. Where only that one week has been selected, the main control gates, such as 103, for each succeeding week remain open, as controlled by the mode and logic circuits 160, whereby the day memories, or memory sections for subsequent weeks are not interrogated. However, in the event that a user has selected one of such future weeks for an appointment, such gates such as gate 103 are closed and the day memories (not shown) for such subsequent weeks are interrogated by the clock pulses, in the same manner as previously described.

In the event that a user desires to make a series of appointments on different days of the same week; or different days of different weeks; or one appointment each week for a series of weeks, the mode configurations shown in FIGS. 3 and FIG. 5 may be jointly used, as controlled by the mode and logic circuit 160. The main control gates 102, 103, and others, are used to control the interrogation of the memories for each different week, as discussed above in FIG. 5. Additional gates such as 43 and 44 in FIG. 3, control the interrogation of the memories for each different day. Therefore the user can select both the weeks of interest as well as the day or days of each week for making appointments. For example, where a user wishes only one appointment each week, for the next two weeks, both of the main gates 102 and 103 are closed by the mode and logic circuit 160. The day memories 112 etc. during the first week are automatically interrogated in sequence until a first free time slot is found, and an appointment at that time is made for that week, and the gate 102 is closed by a pulse over the output line 118. The closure of the main gate 103 enables the five day memories for the second week to be automatically interrogated in sequence, in the same manner as the first week, until the first available time slot is located. An appointment for the second week is therefore made in the same way, and an output pulse over line 133 from the interrogated day memory during the second week is fed back to close the main gate 103, thereby terminating the interrogation of the memories during the second week. Should a series of appointments be desired in a different manner, such as one during the first week and another during a third week, but none during the second week, the appropriate one of the main gates, such as 102, 103 etc. are closed by the mode circuit 160, and the scheduler functions in the same manner as previously described to automatically make the appointments.

Where a series of appointments are desired to be made on different specific days of each week over a period including a number of weeks, such as a first appointment on monday of a first week; a second appointment on wednesday of the second week; and so forth, the gates 108, 109, 110. 111, and 116, for each of the day memories, may also be under the control of the mode and logic circuit 160. Where an appointment is desired on only monday of the first week, the gate 108 for that week is energized by the mode circuit 160 to be closed by the shift register line from 107 whereas all of the other gates 109, 110, 111, and 116 are disabled by the mode circuit 160 and prevented from being interrogated. Similarly, all of the day gates ( not shown) for the second week are disabled by the mode circuit, except for the day gate controlling the wednesday memory. Thus sequences of plural appointments can be automatically made using the same modes, or circuit configurations, as shown.

Briefly summarizing the functioning of the multimode scheduler as above described, the user's selection of a particular mode of operation and of a time parameter within said mode, is interpreted by a mode and logic circuit to energize a series of gate circuits according to the selections to configure the dedicated circuit accordingly. The gates connecting the memory interrogation circuits with selected portions of the internal memory, to automatically interrogate the selected addresses of that memory to locate one (or more) free time slots according to the user's selections. A number of different modes of operation are provided to best coincide with the user's needs or preferences. Among others, the user can select a day mode, or a specific day of the week for an appointment any time during the selected day that is available. Alternatively, the user can select a time-of-day mode along with a preferred time-of-day or any one of a series of preferred times-of-day; and the memory is interrogated in a day-by-day manner until finding a free time slot at the selected time-of-day, or on one of a plurality of selected times-of-day. Still another available mode is the users selection of an appointment during the morning hours, or the afternoon hours, or other extended time period during a day. In this mode the memory is interrogated on a day-by-day basis, but only for the selected interval during each day, until locating a free time slot during such interval on a given day. Still another mode, enables a user to select a given week, or other long time period, and have the electronic scheduler seek to find the earliest free time slot that is available during that specified period of time.

Where the scheduler is to be used for automatically making an appointment with any of a group of different persons, the appointments stored in the memory are identified or tagged according to the different persons in the group as well as by the day and time-of-day of the stored appointment. The user's selection of a particular person of the group is interpreted by the mode and selection circuit to control the automatic interrogation of the memory to seek only appointments made for that selected person, and to ignore appointments of others, in finding a free time slot. Thus the scheduler of the present invention provides a user with a very versatile automatic mechanism for making an appointment with another, by complying with a few highly simplified instructions in selecting a desired mode of operation; one or more time parameters falling within that mode; and/or selecting the person with whom the appointment is desired. In all of such modes of operation, the scheduler performs its operations in an automatic manner, initially finding a free time slot, entering an appointment, and notifying the user of the time and date of the new appointment. The automatic interrogation circuits can be initially preset to interrogate a number of different days, or an entire week or more, if the user selects a preferred time or time period as being suitable for an appointment. In the event that the scheduler is unable to locate a free time slot meeting the user's preferences, the user is then automatically instructed to select a different time parameter, or a different mode-of-operation, or to make an appointment in the usual manual fashion without using the electronic scheduler. The owner of the electronic scheduler, or any one of a group of persons, that in common, provide such scheduler, can obtain readouts of their appointment schedules, or subschedules, for any day or other period of time, as disclosed in the above-mentioned prior applications and patents.

OTHER SCHEDULER USES

In addition to the above described primary uses of the scheduler in automatically making appointments, the owner or owners may wish to make changes in schedules, or subschedules, during an hourly, daily, weekly, or other time period; to manually enter new appointments; reschedule one or more appointments that have been previously made; and otherwise make various changes as a result of emergencies or recently occuring higher priority committments. All of these functions may be performed by entry using the manual keyboard.

A still further function that may be desired by an owner, is to obtain a read-out of a schedule or schedules of PRIORITY appointments, or of NON-PRIORITY appointments. Determining the schedule of previously made PRIORITY appointments is often needed where the owner finds it necessary, or desirable, to make "last minute" changes in one or more appointments, such as adding an emergency appointment, or substituting an emergency appointment for a NON-PRIORITY appointment previously made with another person. For example, a physician may find it necessary to be away from the office on a particular day or time-of-day as a result of an emergency that was not preplanned. Under such circumstances, it is necessary to quickly determine whether any PRIORITY appointments have been previously made (e.g. scheduled operations etc.) for that time that cannot be changed, so that the Physician can quickly find assistance from another Physician to satisfy the conflict in PRIORITY committments. According to the present invention, such PRIORITY or NON-PRIORITY read-out of schedules or subschedules, can be obtained by a different mode of operation as shown in FIG. 6.

Figure 6:
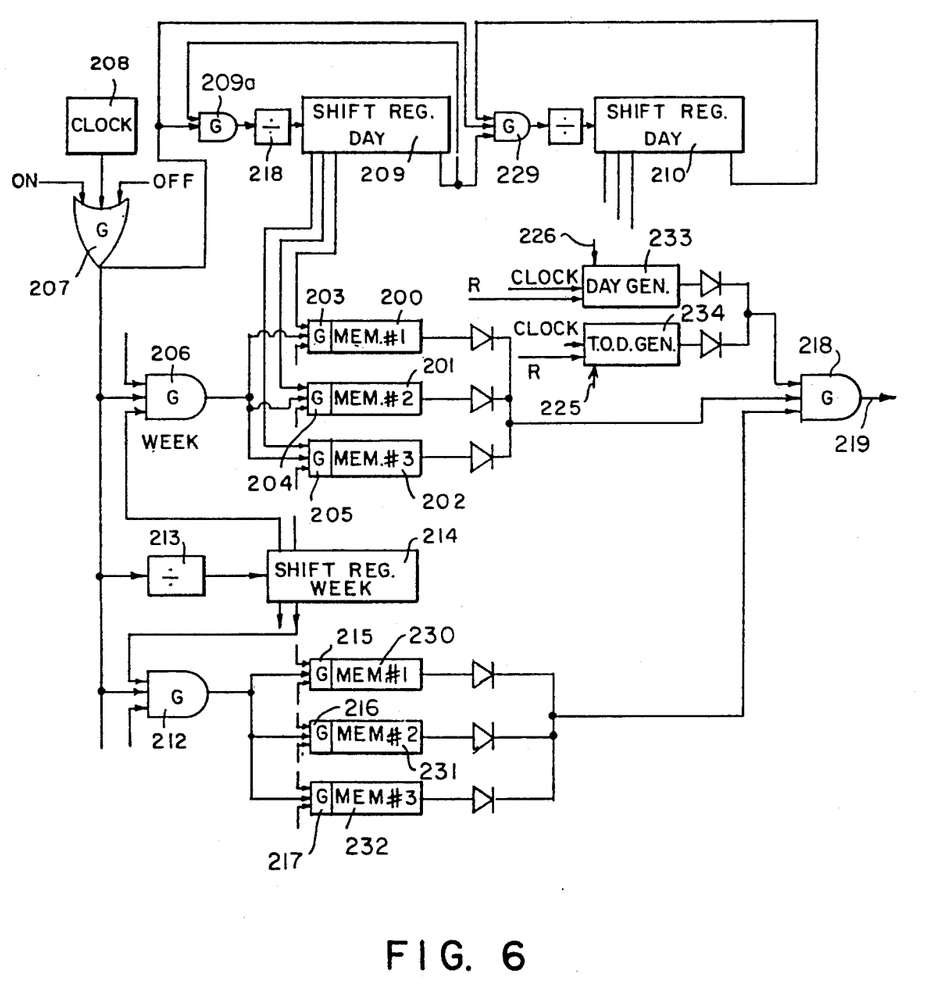
FIG. 6 is a similar block diagram showing the circuitry when the user selects a schedule of Priority appointments and/or non-Priority appointments for a particular time period.

Referring to FIG. 6, all appointments that have been previously made and entered into the day memories 200. 201, 202, ..., for each week, are flagged or identified by one or more bits at each memory address, in the event that such appointment is a PRIORITY type of appointment that is essential or for other reason cannot or should not be changed. Other NON-PRIORITY appointments, not falling within this category are not so identified or flagged in the memory. Upon the owner making a mode selection requesting a read-out of a PRIORITY schedule, the various gates are activated by the mode and logic circuit (not shown in FIG. 6), to interconnect the circuits as shown in FIG. 6. As shown, the memory sections for each day of the first week, e.g. 200, 201, 202, ..., are each interconnected by an associated day gate circuit 203, 204, 205, ..., respectively, to be successively interrogated in response to stepping of a day shift register 209. All of these day memory sections for this first week are jointly under control of a week gating circuit 206, that is, in turn, activated by a weekly shift register 214. In the same manner, each of plural memory sections for a second week 230, 231, 232 are each interconnected by an associated day gate 215, 216, 217, ..., to be successively interrogated in response to the stepping of a day by day shift register 210 for the second week. All of such memory sections for the second week are also jointly under control of a week gating circuit 212, that in turn, is activated by the week shift register circuit 214, as shown.

Upon the owner's selection of the mode of operation calling for a PRIORITY read-out of the schedule of plural appointments, and further selection of a time parameter, including the day, days, or other period of interest, the clock gate 207 is closed, along with the week gate 206 and day gate 203 ( if they are selected), to initiate the automatic interrogation of day memory section 200, during the first week. Each time slot of memory 200 is chronologically interrogated, in response to each succeeding clock pulse from clock 208. Whenever a time slot address is located that has been flagged with a PRIORITY bit or bits, an output signal is generated from memory section 200 to close output gate 218. As discussed above, the day generator 233 and the time-of-day generator 234, are pulsed by the clock 208 concurrently with the interrogations of the different addresses of memory 200, and therefore generate changing digital signals that correspond to the different time slots at each address in the memory 200. Closing of the output gate 218 therefore results in passing to the output line 219 the digital signals representing the time and date from the time slot that has been located with a PRIORITY appointment. Thus after completion of the chronological interrogation of the day memory section, 200 a complete schedule of plural PRIORITY appointments, if any, are generated over the output line 219. As shown in FIG. 1, this schedule can be visually displayed at screen 11, and/or printed by printer 13, and/or an audible announcement of this PRIORITY schedule may be made by annunciator 12. As disclosed in the earlier applications and patents referred to above, a subschedule, or listing of all times-of-day that have not been previously committed to a PRIORITY appointment, may also be read-out, displayed, printed, or announced. This is performed in a similar manner by chronologically interrogating all addresses in the day memory section 200, and detecting, and outputting, those that do not have entered a PRIORITY bit or bits.

In the event, that the day memory section 200 need store only appointment bits and PRIORITY bits for 28 addresses (corresponding to 28 fifteen minute appointments during a business day from 9 AM to 5 PM ), the pulse divider 218 is configured to count 28 pulses and generate an output to advance day shift register 209 to its next position. Its second output line closes the gate 204 for the memory section 201 for the next day, and opens the gate 203 for the first day memory section 200 is opened to discontinue interrogation of the first day memory 200. The second day memory 201 is chronologically interrogated in the same manner as the first day memory section 200, to locate and output an entire schedule of PRIORITY appointments, or subschedule of NON-PRIORITY appointments and/or free time slots, as discussed above. Thus the memories for each day of the first week may be chronogically interrogated in sequence, under control of the shift register 209 and its associated gate, thereby to readout the entire schedules of PRIORITY or NON-PRIORITY appointments for that first week. Upon completing the interrogation of the memory sections for that first week, the sixth output line from shift register 209 is directed in feedback to open its control gate 209a and discontinue the pulsing of shift register 209. This sixth output line is also directed to close the gate 229 controlling energization of the daily shift register 210 for the second week. The clock pulses pass through gate 219 to step the shift register 210 in the same manner as discussed above.

Concurrently, the weekly shift register 214 is advanced to energize its second output line and deenergize its first output line. The second output line closes gate 212 that jointly controls the interrogation of the memory sections for the second week; and the deenergization of its first output line opens the gate 206 that jointly controls the interrogation of the memory sections for the first week. The memory sections for the second week are therefore chronologically interrogated, in series, in the same manner as those of the first week, and during each interrogation generate the entire schedules, or subschedules of PRIORITY or NON-PRIORITY appointments for each day of the second week. This same procedure can be performed for subsequent days, weeks, or other time periods, if desired, and in accordance with the preestablished capacity of the electronic scheduler. However, since the user's are usually only interested in rescheduling appointments, or otherwise making changes, over comparatively short time intervals, such as a day or less, the various weekly gates, e.g. 206, 212, ..., and the various day gates, e.g. 203, 204, 205, 215, 216, 217 ..., are selectively energized by the mode and selection circuit, in response to the owner's keyboard selections, to interrogate only a selected one of the day memory sections, or a few of such sections, or even less than an entire day, if such is of interest. As well known, each of these and gates may be selectively energized by a keyboard selection to remain open or disabled.

In addition to those few different modes of operation as described above, a number of additional modes may be provided for greater flexability of the user in making an appointment. For example, where a user finds it convenient to use a time-of-day mode on certain days, with a day mode on others days, and a week mode with respect to a different week, the circuits of FIGS. 3, 4, and 5 can be variously combined to provide such flexability. It will be noted that in each different mode, the time-of-day gates, and/or day gates, and/or week gates control the interrogation of the memories or memory sections for the specified times or time periods. The shift register circuits on the other hand, control the sequences of the interrogations. Therefore by suitable interconnections of these components with the memories, clocks, and other components, the circuits can be configured with a great deal of versatility, to satisfy a users needs or preferences for an appointment.

Many other changes may be made by those skilled in the art without departing from the spirit and scope of this invention. For example, although 15 minute intervals, over a 9 AM to 5 PM workday, have been referred to, it is believed to be evident that other intervals and parameters may be selected for scheduling appointments over a longer or shorter week, or other time period. Similarly, in seeking a preferred appointment at a selected time or during a selected time period, a variable number of different days, or time periods, can be selected in either the preplanned mode of operation of the scheduler, or can be additionally made selectable by the user. If desired, the scheduler may be provided as a less complex unit having fewer different modes of operation than described, in order to be manufactured in smaller size and lesser expense. Alternatively, with the greater capacity of available RAM microchips for the memory, taken with the greater number of gates and other components on each of such microchips, a considerably more complex scheduler can be provided without greatly increasing the small size, and cost of the pocket size or desktop unit. To increase the speed of automatic scheduling, the various memories or memory sections can be interrogated in parallel rather than in sequence or series, as described above. However, this may increase the complexity, cost, and small size of the scheduler, often requiring a number of concurrently operating duplicate components. Since these and other changes can be made, this invention is to considered only in accordance with the following claims.

What is claimed is:

1. A multiple mode of operation automatic electronic scheduler comprising:

an electronic memory for storing plural time-of-day appointments for each of a series of different days or time periods, and for each of a plurality of different persons, manually operates multiple mode selection mean controlled by a user for selecting one of a series of different modes of operation for locating a free time slot for appointment with a selected one of said persons and in conformance with a desired time parameter selected by a user, automatic memory interrogator means responsive to said multiple mode selection means for automatically interrogating said memory in the mode of operation selected by the user to locate a free time slot for appointment with said selected person and in accordance with the time parameter selected by the user, each different one of said modes-of-operation searching different portions of the memory that are allocated to the storage of appointments at different fractional portions of at least on daily time period, and output means responsive to the automatic interrogation of the memory to communicate said free time slot to the user.

2. In the automatic electronic scheduler of claim 1, said multiple mode selection means including means responsive to the selection of a desired time-of-day mode for controlling the automatic interrogation of only selected portions of said memory (to) allocated to storage of appointments at a desired time-of-day to locate an available time slot for appointment with said selected person at said selected time-of-day.

3. In the automatic electronic scheduler of claim 1, said selection means responsive to the selection of a specific day made for automatically interrogating portion of said memory allocated to said specific day to locate an available time slot for appointment with said selected person on said specific day.

4. In the automatic electronic scheduler of claim 1, said selection means responsive to the selection of a desired portion of a day or time period mode, for person controlling the automatic interrogation portions of said memory allocated to storage of appointments for that portion of a day to locate a free time slot available for appointment with said selected person during the desired portion of a day or time period.

5. In the automatic electronic scheduler of claim 1, said multiple mode selection means responsive the users selection of a desired week mode for appointment, whereby the scheduler automatically interrogates said memory, in the portions thereof corresponding to the desired week, in a chronological manner for an available time slot during said desired week.

6. In the automatic electronic scheduler of claim 1, said multiple mode selection means responsive to a users selection of an appointment on only one specific day of the week, whereby the scheduler automatically interrogates those portions of said memory that are allocated to the storage of appointments for that specific day-of-the-week for an available time slot during the selected day of the week.

7. In the multiple mode of operation electronic scheduler of claim 1, said series of different modes of operation including selective searching of the memory portions corresponding to one of a specific time-of-day; a specific day; a specific week; and a specific day of the week.

8. In the multiple mode of operation electronic scheduler of claim 1, instruction message generating means, said generating means responsive to said multiple mode selection means for communicating instructional messages to a user pertaining to the selection of the different modes of operation and to the selection of different time parameters associated with said modes of operation.

9. In the multiple mode of operation electronic scheduler of claim 1, said output means responsive to the automatic interrogation of the memory failing to locate an available time slot for appointment to interactively instruct the user to select one of a different mode of operation or a different time parameter.

10. A multiple mode-of-operation electronic appointment scheduler comprising:
- an electronic memory for storing plural appointments for each daily time period for a number of different calendar dates,
- a plurality of different dedicated interrogating circuits for the memory,
- each different interrogating circuit operating in a different mode-of-operation for searching the memory for a different fractional portion of a daily time period than the other interrogating circuits,
- manually operated switching means for enabling a user to select one of said different interrogating circuits to search the memory in a desired mode-of-operation,
- additional switching means for enabling said user to select the calendar dates of interest to be searched in that selected mode-of-operation, by the selected interrogating circuit,
- an output circuit for outputting the results of searching the memory,
- a communicating means for the output circuit for communicating to the user the results of searching the memory,
- wherein a user can select a desired fractional portion of a daily period to be searched for any one or more calendar dates.

11. In the electronic scheduler of claim 10,
- an instruction generating means for producing instructions to a user,
- and control means responsive to access and operation of the scheduler by a user for communicating instructions to the user pertaining to the selection of the different modes of operation and the selection of a time parameter for use in locating a free time slot for appointment.

12. In the multiple mode of operation scheduler of claim 10,
- said output means responsive to the interrogation of the memory failing to locate an available time slot for appointment to instruct the user to select one of a different mode of operation or a different time parameter.

13. In the multiple mode of operation scheduler of claim 10,
- said time-of-day appointments stored in said memory each being specifically identified as being one of a PRIORITY appointment or a NON-PRIORITY appointment,
- and said multiple mode selection means including means responsive to the selection of one of a PRIORITY or NON-PRIORITY mode of operation for controlling the interrogation means for selectively reading out of the memory a schedule of plural PRIORITY or NON-PRIORITY appointments.

14. In the electronic scheduler of claim 10,
- one of said different modes-of-operation comprising a "time-of-day" mode wherein only a selected portion of the memory is searched that is allocated to storing appointments at a selected time-of-day.

15. In the electronic scheduler of claim 10,
- one of said different modes-of-operation comprising a "fraction of a day mode" wherein only a fraction of a selected daily time period is searched in the memory to find a free time slot during that fraction of the daily time period.

16. In the electronic scheduler of claim 10,
- one of said different modes-of-operation comprising a "morning" mode wherein only a portion of the memory is searched that is allocated for the storage of appointments during the morning hours of a daily time period.

17. In the electronic scheduler of claim 10,
- one of said different modes-of-operation comprising an "afternoon" mode wherein only a selected portion of the memory is searched that is allocated to storage of appointments during fixed daily periods in the afternoon hours.

18. In the electronic scheduler of claim 10,
- one of the different modes-of-operation comprising a "week" mode wherein a selected portion of the memory is searched that is allocated to storage of appointments for the selected weekly time period.

19. In the electronic appointment scheduler of claim 10,
- one of the different modes-of-operation comprising a "day-of-the-week" mode wherein a portion of the memory is searched that is allocated to the storage of appointments only for a selected day-of-the-week.

20. In the electronic scheduler of clam 10,
- the addition of still further selection circuits controllable by a user to search only selected portion of the memory that are allocated to the storage of appointments for a selected person for whom the user desires an appointment.

21. In the electronic scheduler of claim 10,
- the addition of interfacing circuits for interconnecting the scheduler to a telephone line,
- said interfacing circuits being responsive to signals received over the telephone line to actuate said multiple mode selection circuits,
- whereby a caller over the telephone line can remotely select a different one of said switchable circuits for interrogating the memory.

22. In a multiple mode-of-operation electronic scheduler for enabling a user to promptly find a free time slot for appointment,
- said scheduler having an electronic memory for storing plural appointments each daily period for a number of calendar daily periods, with the different appointments being stored at different allocated portions of the memory corresponding to different times-of-day, different daily time periods, and different weekly time periods,
- a plurality of interrogating circuits for the memory,
- each interrogating circuit being configured for searching only selected portions of the memory corresponding to a different one of a plurality of different modes-of-operation.
- in one mode-of-operation, the interrogating circuit searching only a selected fraction of a daily time period to find a free time slot,
- in another mode-of-operation, the interrogating circuit searching only a selected daily time period to find a free time slot,
- in a further mode-of-operation, the interrogating circuit searching only a selected series of daily time periods to find a free time slot,
- in a still further mode-of-operation, the interrogating circuit searching only a selected weekly period to locate a free time slot,
- manually operated switching means for enabling a user to select one of said interrogating circuits according to the mode-of-operation that is desired for searching the memory,
- and output means for the memory for communicating to the user an available time slot developed by the selected interrogating circuit.

* * * * *